(12) United States Patent
Liu

(10) Patent No.: US 6,941,209 B2
(45) Date of Patent: Sep. 6, 2005

(54) ADAPTIVE CUSTOMER DRIVEABILITY MODULE

(75) Inventor: Haifeng Liu, Troy, MI (US)

(73) Assignee: General Motors Corporation, Detroit, MI (US)

( * ) Notice: Subject to any disclaimer, the term of this patent is extended or adjusted under 35 U.S.C. 154(b) by 90 days.

(21) Appl. No.: 10/650,528

(22) Filed: Aug. 28, 2003

(65) Prior Publication Data

US 2005/0049772 A1 Mar. 3, 2005

(51) Int. Cl.$^7$ ............................................. G06F 17/00
(52) U.S. Cl. .............................. 701/54; 701/55; 701/85; 701/87; 477/78
(58) Field of Search .............................. 701/54, 55, 56, 701/61, 69, 91, 85, 87, 93; 477/78, 107; 180/248

(56) References Cited

U.S. PATENT DOCUMENTS

| | | | | |
|---|---|---|---|---|
| 4,898,138 A | * | 2/1990 | Nishimura et al. | 123/399 |
| 5,337,239 A | * | 8/1994 | Okuda | 701/55 |
| 5,544,053 A | * | 8/1996 | Nakashima | 701/57 |
| 5,803,197 A | * | 9/1998 | Hara et al. | 180/248 |
| 5,983,154 A | * | 11/1999 | Morisawa | 701/56 |
| 6,019,702 A | * | 2/2000 | Ehrenhardt et al. | 477/97 |
| 6,044,318 A | | 3/2000 | Bourdon et al. | 701/65 |
| 6,244,986 B1 | * | 6/2001 | Mori et al. | 477/46 |
| 2002/0143455 A1 | * | 10/2002 | Bidner et al. | 701/69 |

* cited by examiner

Primary Examiner—Tan Q. Nguyen
(74) Attorney, Agent, or Firm—Christopher DeVries (57) ABSTRACT

An engine control system and method adjusts vehicle driveability based on input from a vehicle operator. A selector switch includes a plurality of selector settings corresponding to a plurality of drive modes. The selector switch is moveable between the plurality of selector settings by the vehicle operator. A controller communicates with the selector switch and includes a plurality of predetermined drive settings corresponding to the plurality of drive modes. The controller utilizes predetermined transmission shift points, torque converter slip and throttle position progression data based on a current selector setting chosen by the vehicle operator.

12 Claims, 9 Drawing Sheets

ADAPTIVE CUSTOMER DRIVEABILITY MODULE

FIELD OF THE INVENTION

The present invention relates to vehicle driveability and, more specifically, to a customer adaptive control for vehicle driveability.

BACKGROUND OF THE INVENTION

Figure 1:
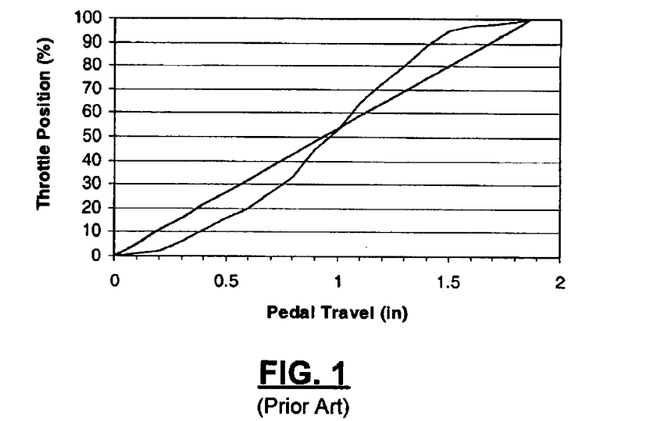
FIG. 1 illustrates an exemplary pedal travel versus throttle position progression.
Figure 2:
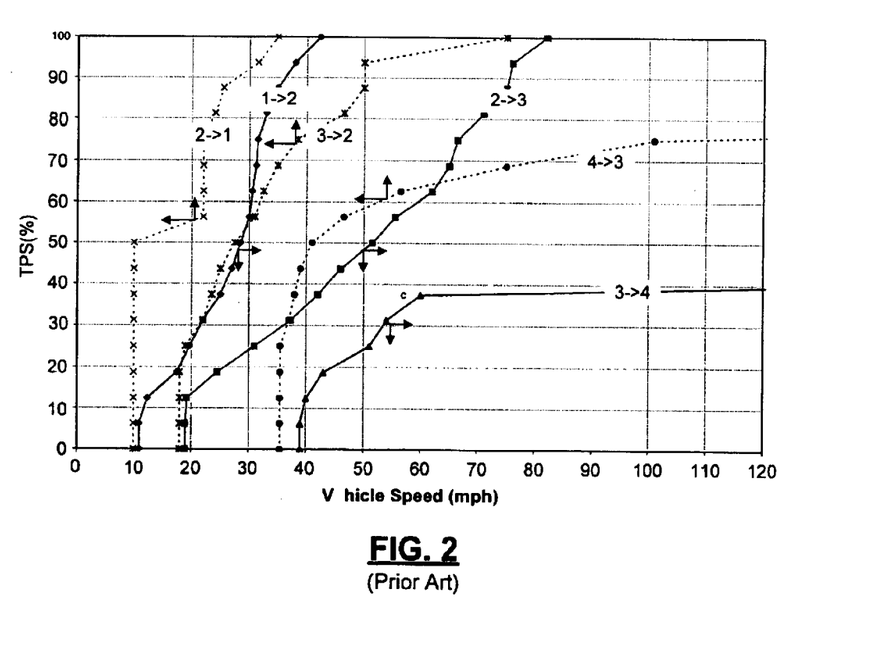
FIG. 2 illustrates an exemplary four-speed transmission shift schedule.
Figure 3:
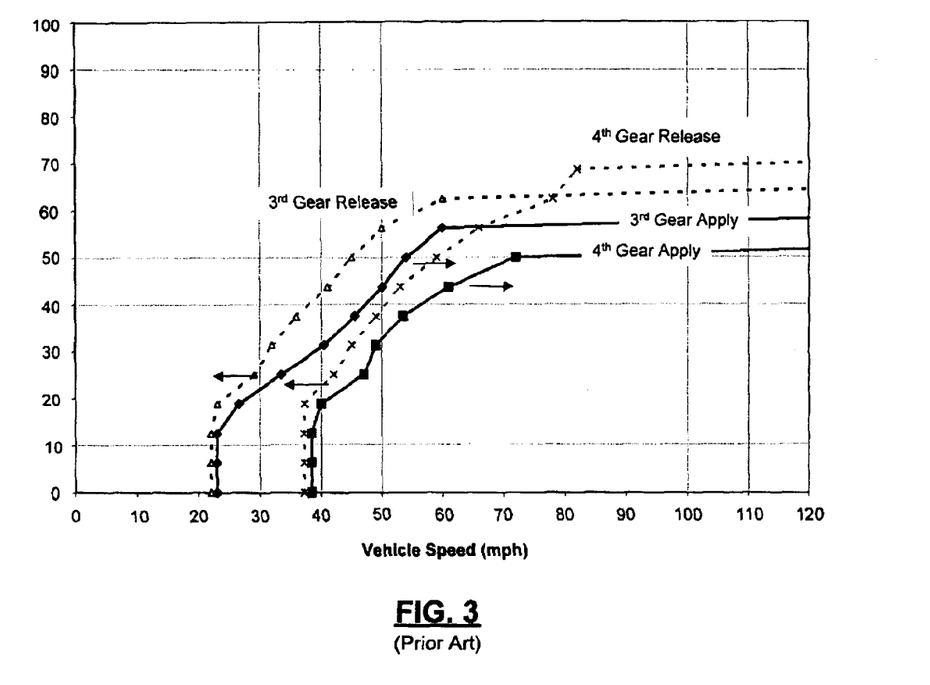
FIG. 3 illustrates an exemplary four-speed transmission torque converter apply and release schedule.

Vehicle driveability is managed according to predetermined calibrations in a conventional powertrain control system. The predetermined calibrations relate to component parameters such as transmission shift points, torque converter slip and throttle position. A typical throttle position progression is shown in FIG. 1. Similarly, a typical four-speed transmission shift schedule and torque converter apply and release schedule are shown in FIGS. 2 and 3, respectively. These calibrations are typically pre-programmed within the vehicle control system and are not changed during the life of the vehicle.

The calibrations generally correspond to the classification of vehicle. For example, a vehicle catering to the sports car market would typically include transmission and torque converter calibrations having aggressive characteristics. An aggressive transmission calibration would include gear shifting patterns to achieve increased acceleration.

Similarly, a luxury vehicle may include transmission and torque converter calibrations corresponding to a smooth and relaxed ride. A smooth transmission calibration incorporates a shifting pattern having uniform acceleration while making gear shifts substantially transparent to the driver.

In the same way, throttle position corresponds to pedal position according to predetermined calibrations. A vehicle with an aggressive calibration would correspond to a higher throttle position than a vehicle with a less aggressive calibration for the same pedal position.

SUMMARY OF THE INVENTION

An engine control system and method adjusts vehicle driveability based on input from a vehicle operator. The engine control system includes a throttle, transmission and torque converter. A selector switch includes a plurality of selector settings corresponding to a plurality of drive modes. The selector switch is moveable between the plurality of selector settings by the vehicle operator. A controller communicates with the selector switch and includes a plurality of predetermined drive settings corresponding to the plurality of drive modes. The controller utilizes predetermined transmission shift points, torque converter slip and throttle position progression data based on a current selector setting chosen by the vehicle operator.

In other features, a mode display provides visual confirmation to the vehicle operator of the current selector setting.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements.

Figure 4:
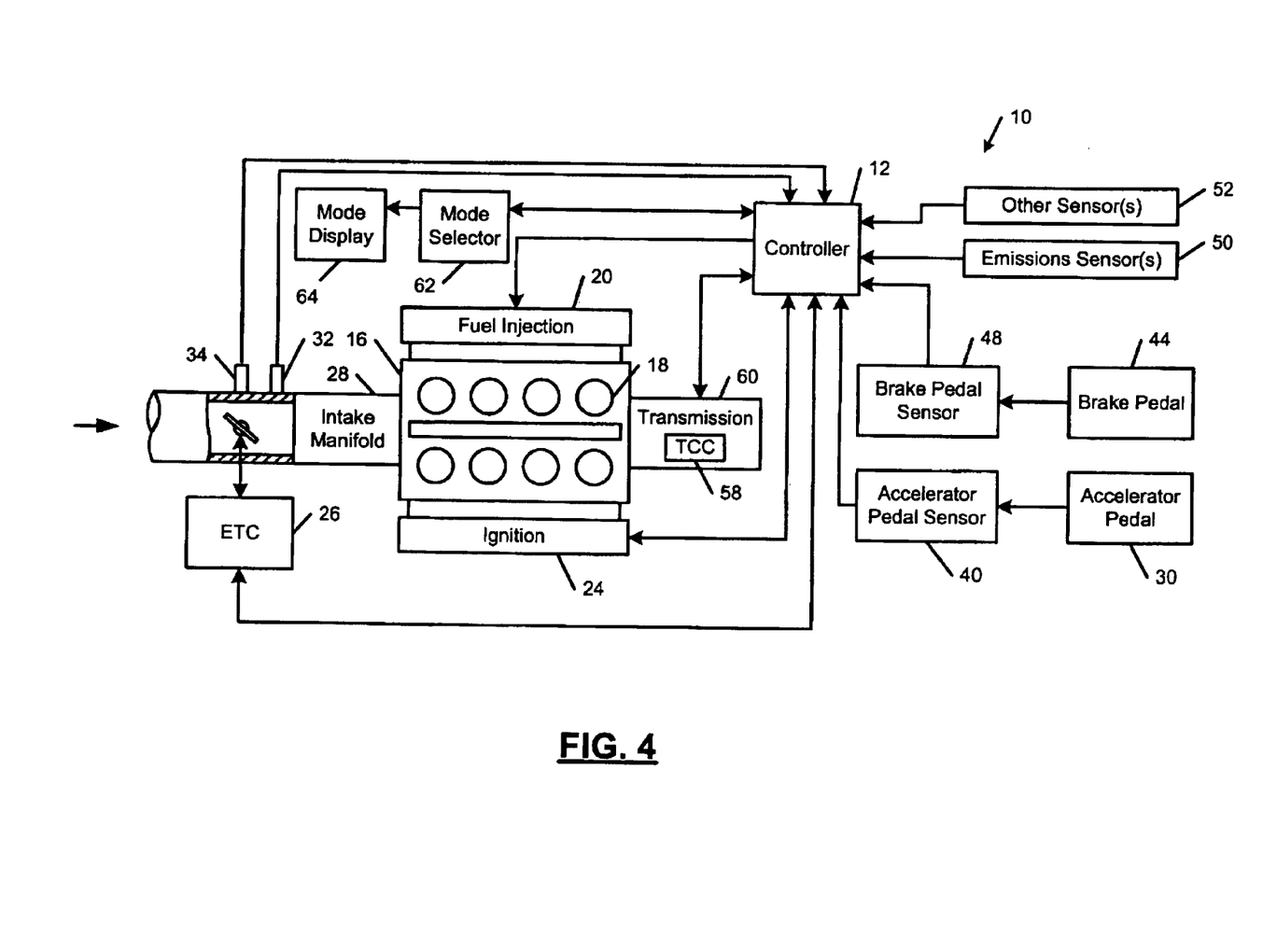
FIG. 4 is a functional block diagram of an engine control system that adjusts vehicle driveability according to the present invention.

With initial reference to FIG. 4, an engine control system 10 according to the present invention includes a controller 12 and an engine 16. The engine 16 includes a plurality of cylinders 18 each with one or more intake valves and/or exhaust valves (not shown). The engine 16 further includes a fuel injection system 20 and an ignition system 24. An electronic throttle controller (ETC) 26 adjusts a throttle area in an intake manifold 28 based upon a position of an accelerator pedal 30 and a throttle control algorithm that is executed by the controller 12. It will be appreciated that ETC 26 and controller 12 may include one or more controllers. One or more sensors 30 and 32 such as a manifold pressure sensor and/or a manifold air temperature sensor sense pressure and/or air temperature in the intake manifold 20.

A position of the accelerator pedal 30 is sensed by an accelerator pedal sensor 40, which generates a pedal position signal that is output to the controller 12. A position of a brake pedal 44 is sensed by a brake pedal sensor 48, which generates a brake pedal position signal that is output to the controller 12. Emissions system sensors 50 and other sensors 52 such as a temperature sensor, a barometric pressure sensor, and other conventional sensor and/or controller signals are used by the controller 12 to control the engine 16. An output of the engine 16 is coupled by a torque converter clutch 58 and a transmission 60 to front and/or rear wheels.

A mode selector 62 communicates with the controller 12 to identify the current drive mode of the vehicle operator. The mode selector 62 includes four distinct drive modes available to the driver. Skilled artisans will appreciate, however, that a different amount of drive modes having various driving characteristics may be implemented. The mode selector 62 is preferably an electrical switch and may include switching arrangements such as an electric button switch or toggle switch, for example. The mode selector 62 is preferably mounted in the vehicle cabin in an area of easy access to the driver such as the console or dashboard. A mode display 64 communicates with the mode selector 62 and provides visual confirmation to the driver of the current drive mode. The mode display 64 is preferably mounted on the vehicle dashboard or is included in an existing driver information display system.

The mode selector 62 includes a first mode having high sport vehicle characteristics (mode 1); a second mode having highly responsive vehicle characteristics (mode 2); a third mode having normal responsive vehicle characteristics (mode 3); and a fourth mode having relaxed vehicle characteristics (mode 4). The selections are preferably arranged from most aggressive or high sport to luxury or relaxed.

According to an alternate embodiment, an additional selection (auto mode) may be incorporated. When in auto mode, the controller 12 determines appropriate calibrations based on the driver's characteristics. If the driver actuates the accelerator pedal 30 aggressively over a given period, the controller 12 will implement vehicle calibrations consistent with mode 1. Similarly, if the accelerator pedal 30 is manipulated less aggressively, the controller 12 will implement less aggressive calibrations. The respective modes which are collectively referred to as vehicle mode data, correspond to vehicle powertrain control data associated with the transmission 60, the torque converter clutch 58, the ETC 26 and the accelerator pedal sensor 40.

Figure 5:
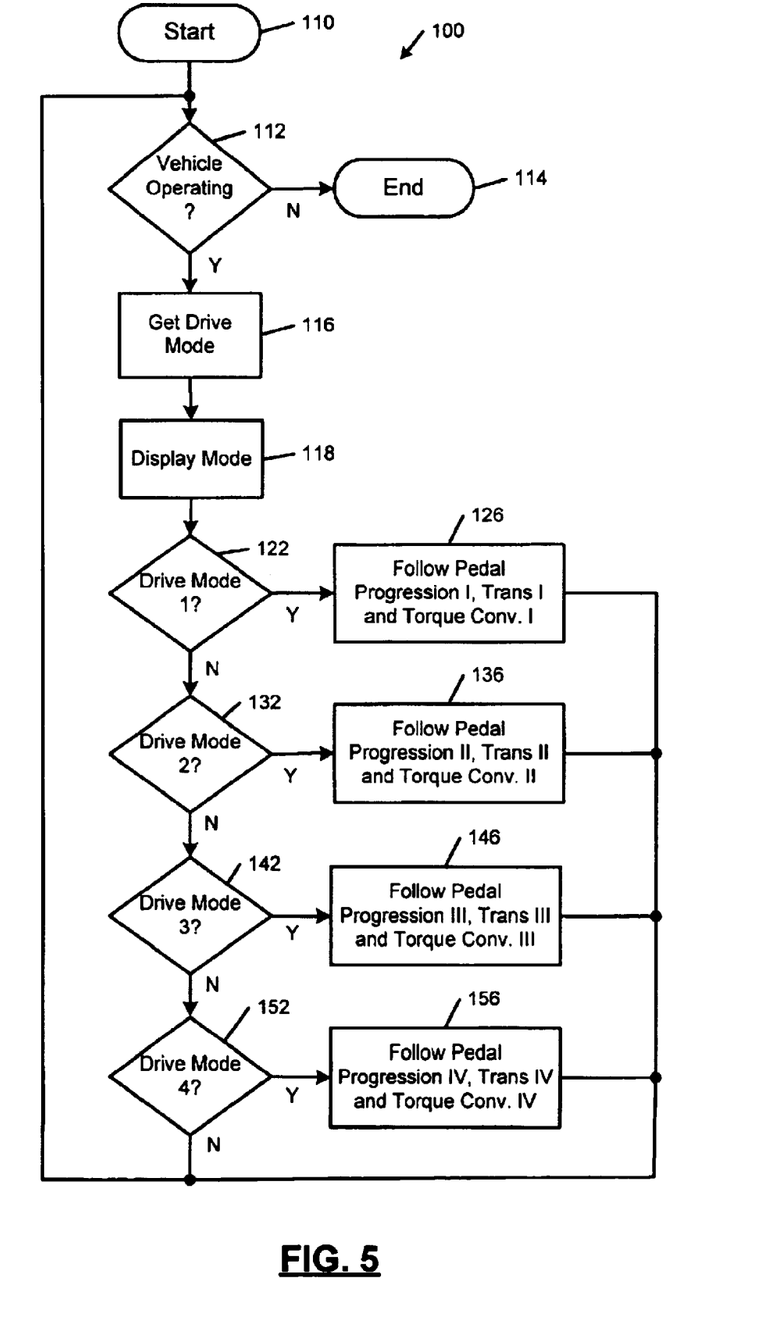
FIG. 5 is a flowchart illustrating steps of adjusting vehicle driveability according to the present invention.

Referring to FIG. 5, a method for adjusting vehicle driveability for a vehicle having 4 drive modes according to the present invention is shown and generally identified at reference 100. Control begins with step 110. In step 112, control determines if the vehicle is operating. If the vehicle is operating, the controller 12 communicates with the mode selector 62 to obtain the current drive mode in step 116. If the vehicle is not operating, control ends in step 114. In step 118, the current mode is displayed to the vehicle operator by the mode display 64. In step 122, control determines if the current drive mode is set to 1. If not, control determines if the current drive mode is set to 2 in step 132. If the current drive mode is set to mode 1, the controller 12 utilizes vehicle mode data associated with mode 1 in step 126. If the current drive mode is set to 2, control utilizes vehicle mode data associated with mode 2 in step 136. If the current drive mode is not set to 2, control determines if the current drive mode is set to 3 in step 142. If not, control determines if the current drive mode is set to 4 in step 152. If the current vehicle drive mode is set to 3, control utilizes vehicle mode data associated with mode 3 in step 146. If the current drive mode is set to 4, control utilizes vehicle mode data associated with mode 4 in step 156. If control determines the current drive mode is not set to 4, control loops to step 114. The continuous loop allows the driver to switch modes during vehicle operation.

Figure 6:
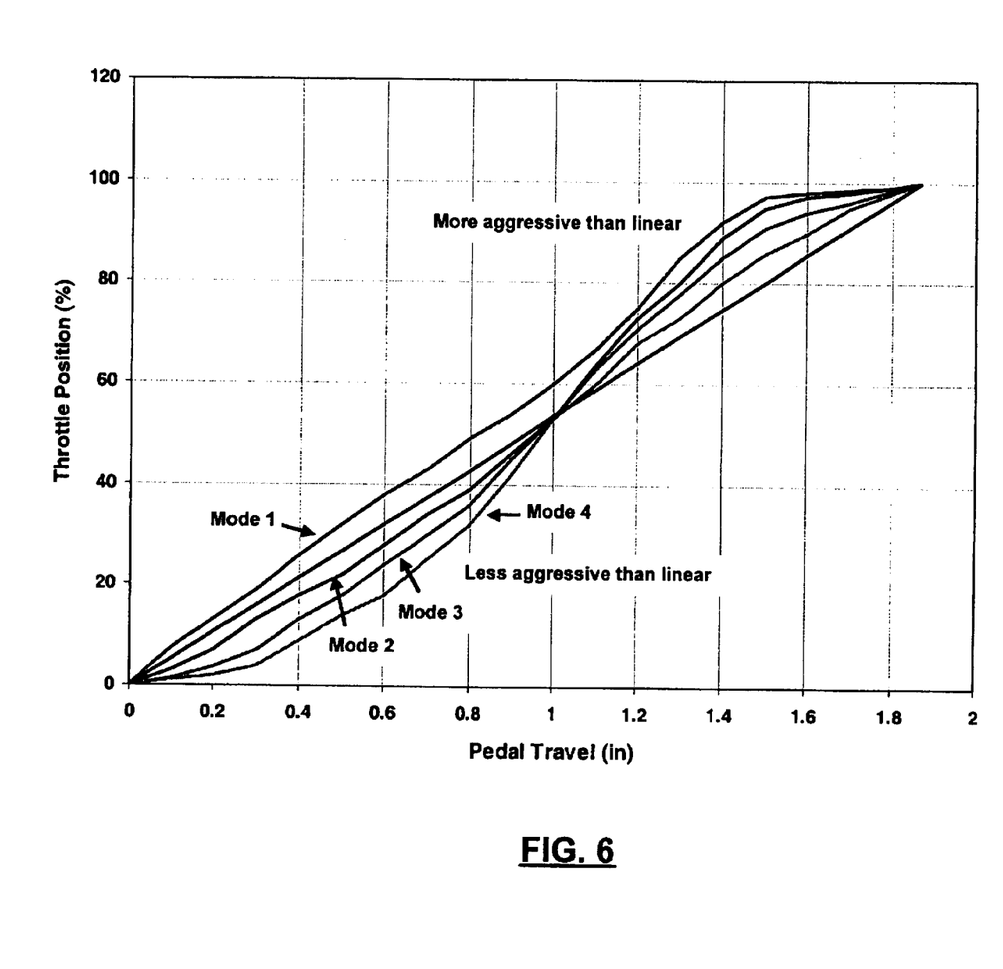
FIG. 6 illustrates exemplary pedal travel versus throttle position progressions for four drive modes according to the present invention.
Figure 7:
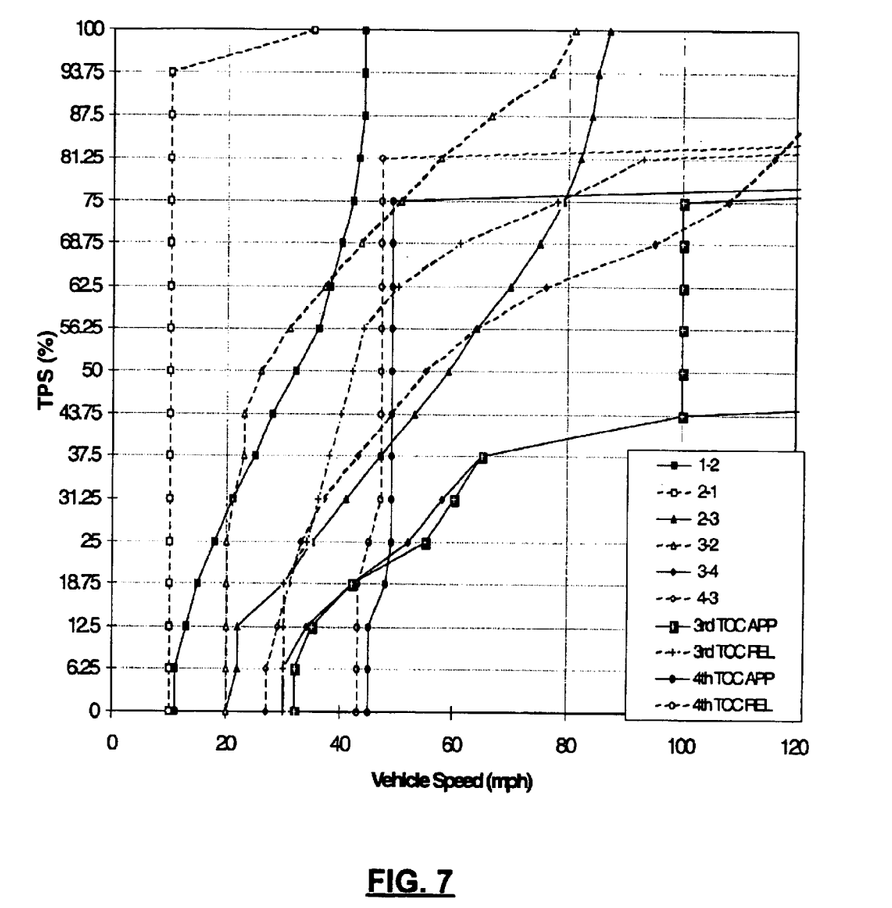
FIG. 7 illustrates exemplary transmission and torque converter patterns for drive mode 1.
Figure 8:
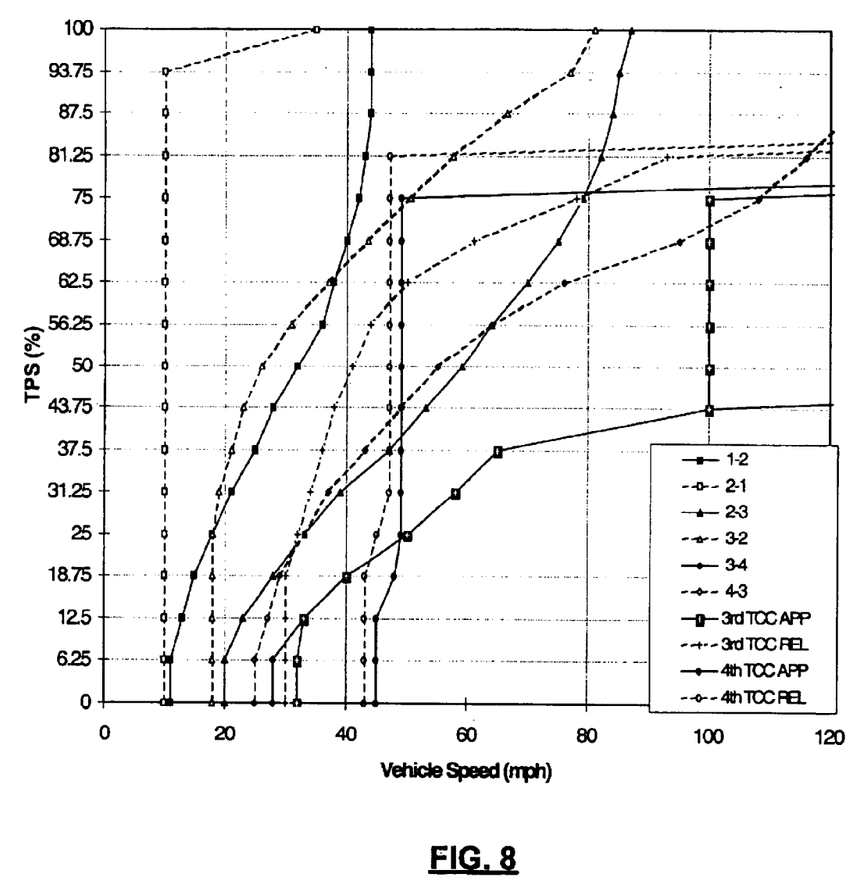
FIG. 8 illustrates exemplary transmission and torque converter patterns for drive mode 2.
Figure 9:
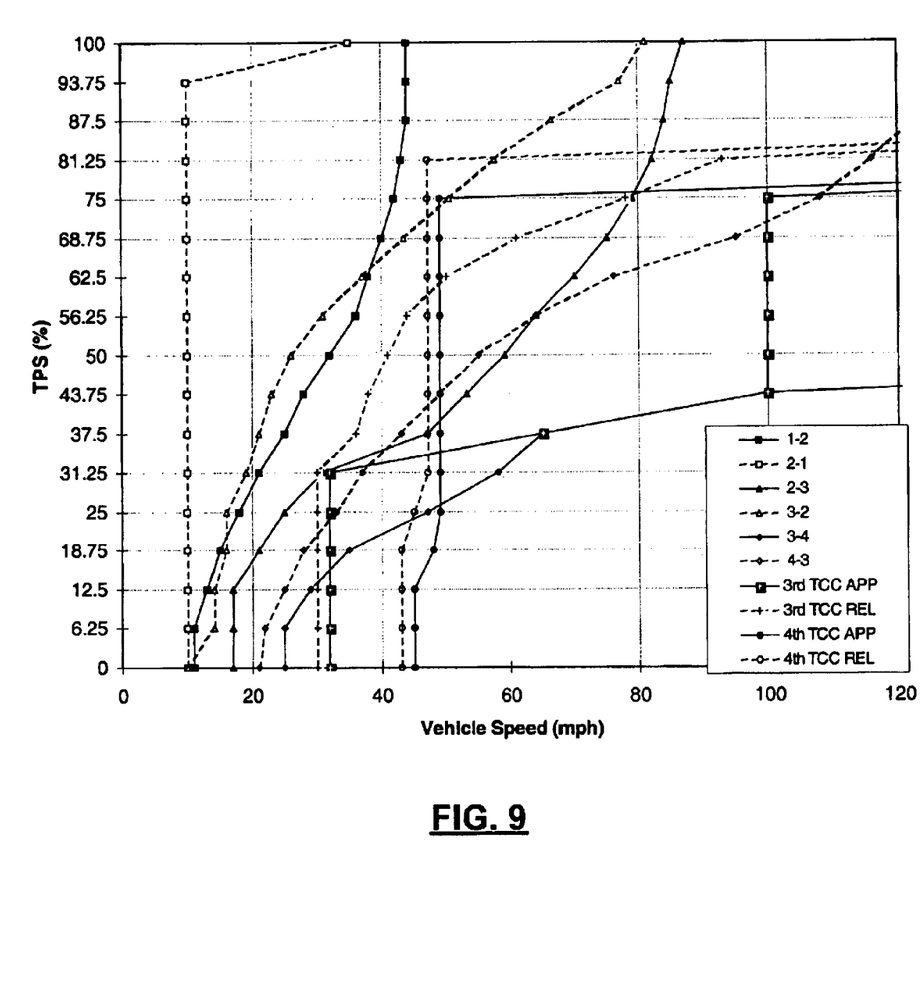
FIG. 9 illustrates exemplary transmission and torque converter patterns for drive mode 3.
Figure 10:
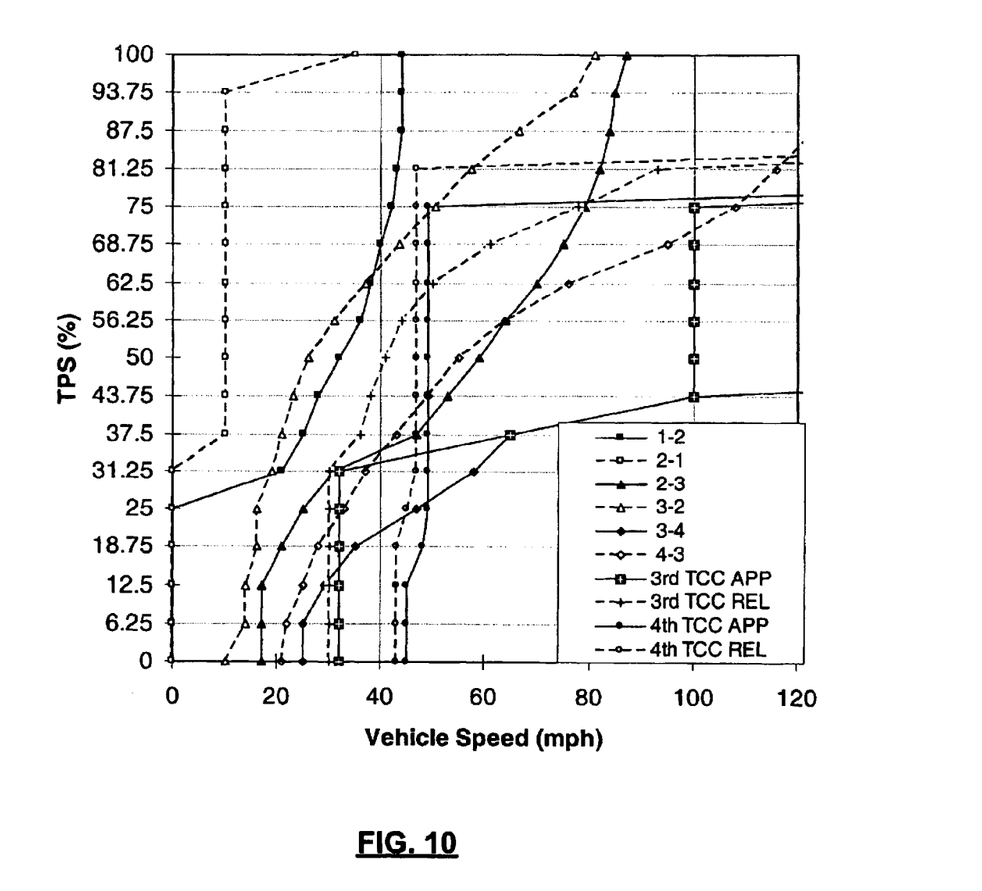
FIG. 10 illustrates exemplary transmission and torque converter patterns for drive mode 4.

With reference to FIG. 6, throttle position progressions according to the exemplary vehicle mode data will be described in greater detail. In general, a vehicle set to mode 1 corresponds to an increased throttle position for a given pedal position as compared to the less aggressive modes 2 through 4. In addition, modes 2 through 4 range from an increased to a decreased throttle position for the same pedal position up to a predetermined value (in this case, one inch). As pedal travel increases beyond the predetermined value, modes 2 through 4 follow an inverse relationship toward a throttle position of 100%. Skilled artisans will recognize that the throttle position progressions may have alternate configurations.

Turning now to FIGS. 7–10, transmission and torque converter patterns will be described with respect to the exemplary vehicle mode data. As a general trend, vehicle mode data corresponding to modes 1 through 4 corresponding to FIGS. 7–10 range from most aggressive to least aggressive. Accordingly, a downshift request is communicated from the controller 12 to the transmission 16 at a lower throttle position for mode 1 compared with mode 4 for a given vehicle speed. Similarly, an upshift request is communicated at an increased speed for mode 1 compared to mode 4 for a given throttle position. With respect to torque converter apply and release schedules, a torque converter apply request is maintained in third gear for mode 4 through a higher throttle position with vehicle speeds between 35 and 60 mph compared to the same speed in mode 1. Again, it will be understood that the exemplary mode data may be arranged to create alternative characteristics.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for adjusting vehicle driveability based on an input from a vehicle operator, comprising:
   a transmission;
   a torque converter;
   a throttle;
   a selector switch having a plurality of selector settings corresponding to a first and second drive mode, said selector switch moveable between said plurality of selector settings by said vehicle operator; and
   a controller that communicates with said selector switch and that includes a plurality of predetermined drive settings corresponding to said first and second drive mode;
   wherein said controller utilizes predetermined transmission shift points, torque converter slip and throttle position progression data based on a current selector setting chosen by said vehicle operator, wherein said first drive mode defines throttle positions that are greater than corresponding throttle positions of said second drive mode for pedal positions less than a first value and defines throttle positions that are less than corresponding throttle positions of said second drive mode for pedal positions greater than said first value.

2. The engine control system of claim 1, further comprising a mode display providing visual confirmation to said vehicle operator of said current selector setting.

3. The engine control system of claim 1 wherein said selector switch is an electrically-actuated switch.

4. The engine control system of claim 1 wherein said selector switch is a toggle switch.

5. The engine control system of claim 1 wherein said plurality of selector settings includes a setting option whereby said controller utilizes predetermined transmission shift points, torque converter slip and throttle position progression data based on driver input patterns to said Throttle.

6. The control system of claim 1 wherein said plurality of selector settings includes a third drive mode defining throttle positions that are greater than corresponding throttle positions of said first and second drive modes up to and beyond said first value.

7. A method for adjusting vehicle driveability based on an input from a vehicle operator for a vehicle having a throttle, transmission and torque converter, said method comprising:

provoiding a selector having a plurality of driveability settings corresponding to a plurality of driveability modes;

determining a current driveability setting based on said selector;

utilizing predetermined transmission shift point data for said transmission based on said current driveability setting;

utilizing predetermined torque converter slip data for said torque converter based on said current driveability setting; and utilizing predetermined throttle position progression versus pedal travel data based on said current driveability setting, wherein a first driveability mode defines throttle positions that are greater than corresponding throttle positions of a second driveability mode for pedal positions less than a first value and defines throttle positions that are less than corresponding throttle positions of said second driveability mode for pedal positions greater than said first value.

8. The method according to claim 7, further comprising displaying said current driveability setting to said vehicle operator.

9. The method according to claim 7 wherein said plurality of driveability modes correspond to various degrees of vehicle acceleration.

10. The method of claim 7 wherein said plurality of driveability modes further includes a third driveability mode defining throttle positions that are greater than corresponding throttle positions of said first and second driveability modes up to and beyond said first value.

11. A method for adjusting vehicle driveability based on an input from a vehicle operator, said method comprising:

determining a user selected drive setting corresponding to a first and second drive mode; and utilizing predetermined throttle position versus pedal travel progression data based on said user selected drive setting, wherein a first drive mode defines throttle positions that are greater than corresponding throttle positions of a second drive mode for pedal positions less than a first value and defines throttle positions that are less than corresponding throttle positions of said second drive mode for pedal positions greater than said first value.

12. The method of claim 11 wherein said drive setting includes a third drive mode defining throttle positions that are greater than corresponding throttle positions of said first and second drive modes up to and beyond said first value.

* * * * *